(12) United States Patent
Lai

(10) Patent No.: US 8,294,676 B2
(45) Date of Patent: Oct. 23, 2012

(54) TOUCH CONTROL ELECTRONIC DEVICE AND OPERATING METHOD THEREOF

(75) Inventor: Lai-Chen Lai, Taoyuan (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 995 days.

(21) Appl. No.: 12/325,302

(22) Filed: Dec. 1, 2008

(65) Prior Publication Data

US 2010/0026637 A1    Feb. 4, 2010

(30) Foreign Application Priority Data

Jul. 31, 2008  (TW) ................................ 97129135 A

(51) Int. Cl.
*G09G 5/00* (2006.01)
*G06F 3/041* (2006.01)

(52) U.S. Cl. .......................................... 345/173; 345/156

(58) Field of Classification Search .......... 345/156–184, 345/104; 178/18.01–20.04; 715/863
See application file for complete search history.

(56) References Cited

U.S. PATENT DOCUMENTS

| | | | | |
|---|---|---|---|---|
| 7,253,643 B1 * | 8/2007 | Seguine | ......................... | 324/686 |
| 2004/0252109 A1 * | 12/2004 | Trent et al. | ..................... | 345/174 |
| 2006/0028454 A1 * | 2/2006 | Branton et al. | ............... | 345/173 |
| 2006/0044285 A1 * | 3/2006 | Sato et al. | ....................... | 345/173 |
| 2006/0227117 A1 * | 10/2006 | Proctor | ........................... | 345/173 |
| 2007/0057922 A1 * | 3/2007 | Schultz et al. | ................. | 345/173 |
| 2008/0024455 A1 * | 1/2008 | Lee et al. | ........................ | 345/173 |
| 2008/0273009 A1 * | 11/2008 | Goda et al. | ..................... | 345/156 |
| 2008/0273017 A1 * | 11/2008 | Woolley et al. | ............... | 345/173 |
| 2009/0008161 A1 * | 1/2009 | Jones et al. | ................. | 178/18.06 |
| 2009/0153518 A1 * | 6/2009 | Paczkowski | .................. | 345/173 |
| 2009/0153527 A1 * | 6/2009 | Paczkowski | .................. | 345/184 |
| 2011/0031041 A1 * | 2/2011 | Bulea et al. | ................ | 178/18.06 |
| 2012/0144345 A1 * | 6/2012 | Munter et al. | ................. | 715/863 |

FOREIGN PATENT DOCUMENTS

CN            101162420         4/2008

OTHER PUBLICATIONS

English language translation of abstract of CN 101162420 (published Apr. 16, 2008).

* cited by examiner

*Primary Examiner* — Alexander Eisen
*Assistant Examiner* — Patrick F Marinelli
(74) *Attorney, Agent, or Firm* — Thomas|Kayden

(57) ABSTRACT

A method of operating a touch control electronic device includes the steps of: (a) activating a program; (b) detecting a touch signal forming a curve, which includes a first sensing point and a second sensing point; and (c) calculating a distance variation between the first sensing point and the second sensing point with a reference point so as to change an attribute value of the program, wherein the reference point is set according to the curve.

12 Claims, 7 Drawing Sheets

TOUCH CONTROL ELECTRONIC DEVICE AND OPERATING METHOD THEREOF

This application claims the benefit of Taiwan application Serial No. 97129135, filed Jul. 31, 2008, the subject matter of which is incorporated herein by reference.

BACKGROUND OF THE INVENTION

1. Field of the Invention

The invention relates in general to a touch interface and an operating method thereof, and more particularly to a touch control electronic device and an operating method thereof.

2. Description of the Related Art

Conventionally, communication interfaces between human and computers or machines are mainly based on keyboards and mice. With the trend of the technological product toward the friendlier man-machine interface, the applications of the touch interfaces become more and more popularized. Recently, the flourishing development of the highly technological industry brings the development of the information and consumer products. The user is eager for an operation interface that can be easily operated so that the touch interface has become the design stream of the product.

In the field of the mobile technology, handheld electronic devices, such as a personal digital assistant (PDA), a smart phone, a portable video game, a portable multimedia player and a portable navigation device, also adopt touch panels to satisfy the miniaturized design trend. In addition, the touch inducing manipulation method of the recently developed touch wheel has overcome the conventional mechanical manipulation method, in which typical keys and a scroll wheel are equipped. The touch wheel may directly sense the circular movement of the user's finger. The user only has to put his/her finger on the touch wheel and to slide, rotate or touch the peripheral and middle keys of the wheel to select the items on the screen, to adjust the volume, or to click the songs so that the handheld electronic device can be easily operated.

Thus, it is a new direction for the future product development to effectively apply the touch interface to create the new product using the method so that the user can operate the touch interface more conveniently and instinctively and the man-machine interaction effectiveness of the user can be enhanced.

SUMMARY OF THE INVENTION

The invention is directed to a touch control electronic device and an operating method thereof so that a user can change an attribute value of a program through the finger touch in an instinctive operating manner. Thus, the convenience in use and the operation efficiency can be enhanced.

According to a first aspect of the present invention, a touch control electronic device including a program, a sensing unit, a calculating unit and a processing unit is provided. The program has an attribute value. The sensing unit is for detecting a touch signal forming a curve. The calculating unit is for calculating a distance variation between a first sensing point and a second sensing point with a reference point, wherein the reference point is set according to the curve. The processing unit changes the attribute value of the program according to the distance variation.

According to a second aspect of the present invention, an operating method of a touch control electronic device is provided. The method includes the steps of: (a) activating a program; (b) detecting a touch signal forming a curve including a first sensing point and a second sensing point; and (c) calculating a distance variation between the first sensing point and the second sensing point with a reference point so as to change an attribute value of the program, wherein the reference point is set according to the curve.

The invention will become apparent from the following detailed description of the preferred but non-limiting embodiments. The following description is made with reference to the accompanying drawings.

DETAILED DESCRIPTION OF THE INVENTION

Figure 1A:
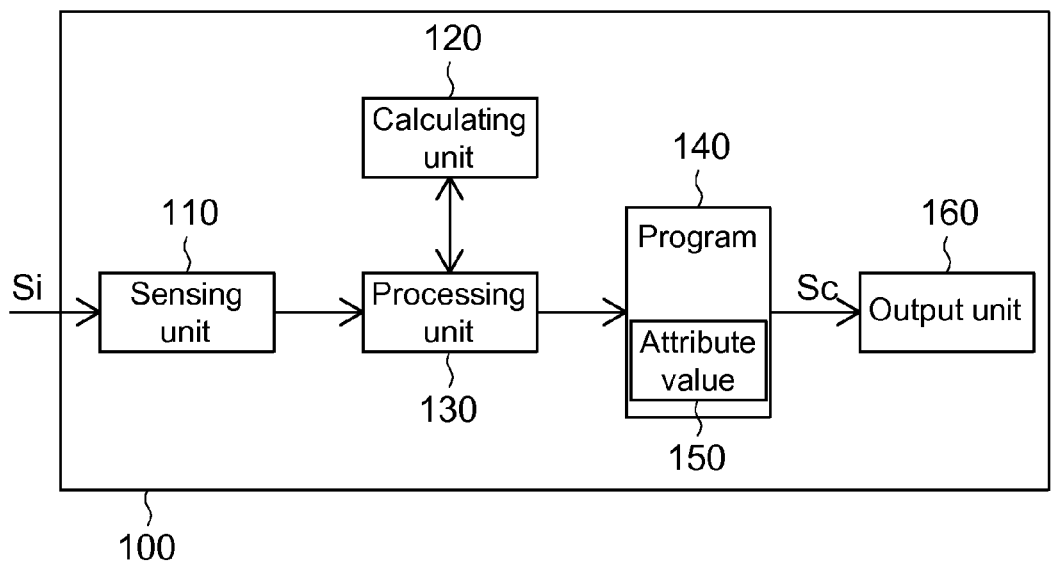
FIG. 1A is a block diagram showing a touch control electronic device according to an embodiment of the invention.

FIG. 1A is a block diagram showing a touch control electronic device according to an embodiment of the invention. Referring to FIG. 1A, the touch control electronic device includes a sensing unit 110, a calculating unit 120, a processing unit 130 and a program 140. The program 140 has an attribute value 150. The sensing unit 110 is for detecting a touch signal Si forming a curve. The calculating unit 120 is for calculating a distance variation between a first sensing point and a second sensing point with a reference point, wherein the reference point is set according to the curve. The processing unit 130 changes the attribute value 150 of the program 140 according to the distance variation. The touch control electronic device further includes an output unit 160 for receiving a control signal Sc from the program 140.

Figure 1B:
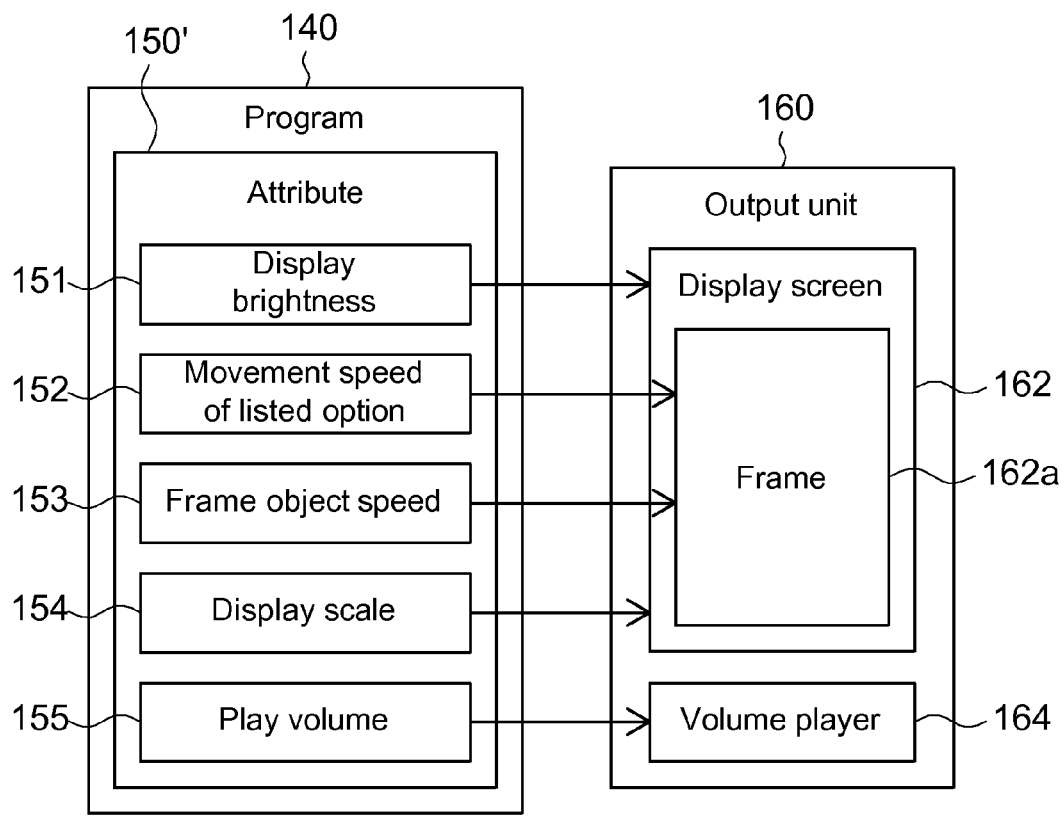
FIG. 1B is a detailed block diagram showing a program and an output unit in the touch control electronic device of FIG. 1A.

FIG. 1B is a detailed block diagram showing a program and an output unit in the touch control electronic device of FIG. 1A. As shown in FIG. 1B, an attribute 150' of the program 140 may be a display brightness 151, a movement speed 152 of a listed option, a frame object speed 153, a display scale 154, a play volume 155 or any combination thereof. The output unit 160 may be a display screen 162, a frame 162a of the display screen 162, a volume player 164 or the combination thereof, in response to the set attribute 150' of the program 140.

When the attribute 150' of the program 140 is set as the movement speed 152 of the listed option, the attribute value 150 possessed by the program 140 is the variation rate of the movement speed 152 of the listed option. At this time, the program 140 controls the movement speed 152 of the listed option in the frame 162a. In response to the set attribute 150' of the program 140, the output unit 160 includes the display screen 162 for displaying the frame 162a. The processing unit 130 adjusts the variation rate of the movement speed 152 of the listed option in the frame according to the distance variation so that the variation rate of the movement speed 152 of the listed option in the frame 162a is changed with the distance variation.

When the attribute 150' of the program 140 is set as the display brightness 151, the attribute value 150 possessed by the program 140 is the variation rate of the display brightness 151. At this time, the program 140 controls the display brightness 151. In response to the set attribute 150' of the program 140, the output unit 160 includes the display screen 162 having the display brightness 151. The processing unit 130 adjusts the variation rate of the display brightness 151 according to the distance variation so that the variation rate of the display brightness 151 is changed with the distance variation.

When the attribute 150' of the program 140 is set as the display scale 154, the attribute value 150 possessed by the program 140 is the variation rate of the display scale 154. At this time, the program 140 controls the display scale 154. In response to the set attribute 150' of the program 140, the output unit 160 includes the display screen 162 having the display scale 154. The processing unit 130 adjusts the variation rate of the display scale 154 according to the distance variation so that the variation rate of the display scale 154 is changed with the distance variation.

When the attribute 150' of the program 140 is set as the play volume 155, the attribute value 150 possessed by the program 140 is the variation rate of the play volume 155. At this time, the program 140 controls the play volume 155. In response to the set attribute 150' of the program 140, the output unit 160 includes the volume player 164 having the play volume 155. The processing unit 130 adjusts the variation rate of the play volume 155 according to the distance variation so that the variation rate of the play volume 155 is changed with the distance variation.

When the attribute 150' of the program 140 is set as the frame object speed 153, the attribute value 150 possessed by the program 140 is the variation rate of the frame object speed 153. At this time, the program 140 controls the object speed 153 of the frame 162a. In response to the set attribute 150' of the program 140, the output unit 160 includes the display screen 162 for displaying the frame 162a. The processing unit 130 adjusts the variation rate of the frame object speed 153 according to the distance variation so that the variation rate of the object speed 153 of the frame 162a is changed with the distance variation.

Figure 2:
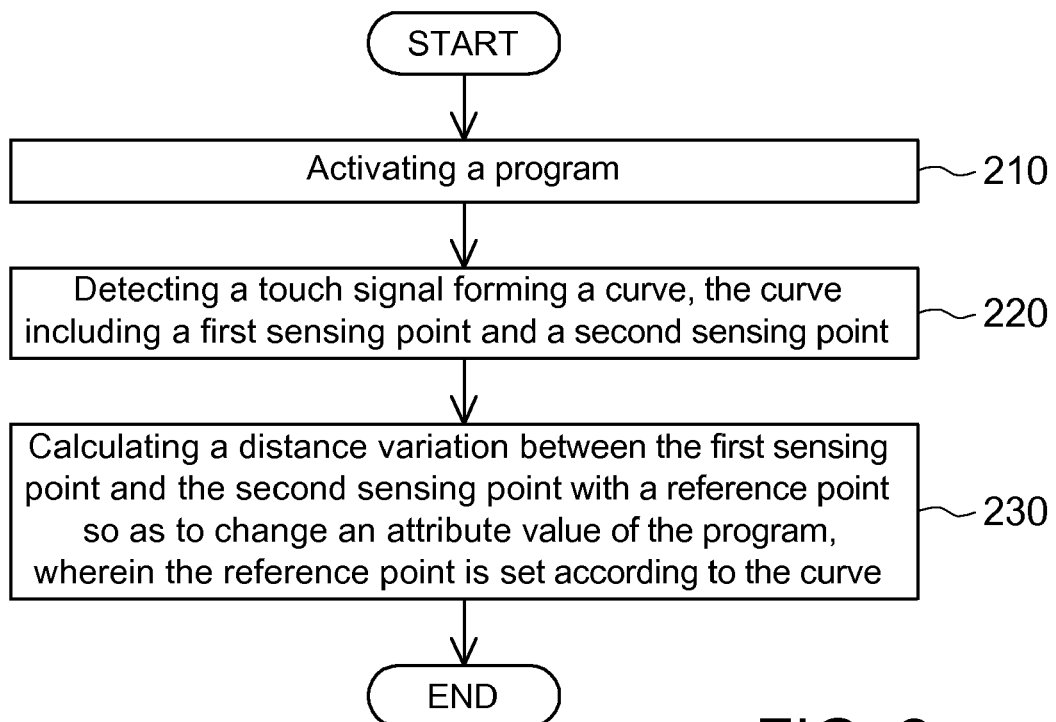
FIG. 2 is a flow chart showing an operating method of the touch control electronic device according to the embodiment of the invention.

FIG. 2 is a flow chart showing an operating method of the touch control electronic device according to the embodiment of the invention. Referring to FIG. 2, the operating method includes the following steps. First, in step 210, a program is activated. As shown in step 220, a touch signal is detected, the touch signal forming a curve, and the curve including a first sensing point and a second sensing point. Next, in step 230, a distance variation between the first sensing point and the second sensing point with a reference point is calculated so as to change an attribute value of the program. The reference point is set according to the curve. The operating method of the touch control electronic device according to the embodiment of the invention may be applied to the control of the movement speed of the listed option in the frame, the control of the display brightness of the display screen, the control of the display scale of the display screen, the control of the play volume of the volume player, the control of the object speed in the frame, or the control of the adjustment of other attributes of the program. The details will be described in the following.

Figure 3A:
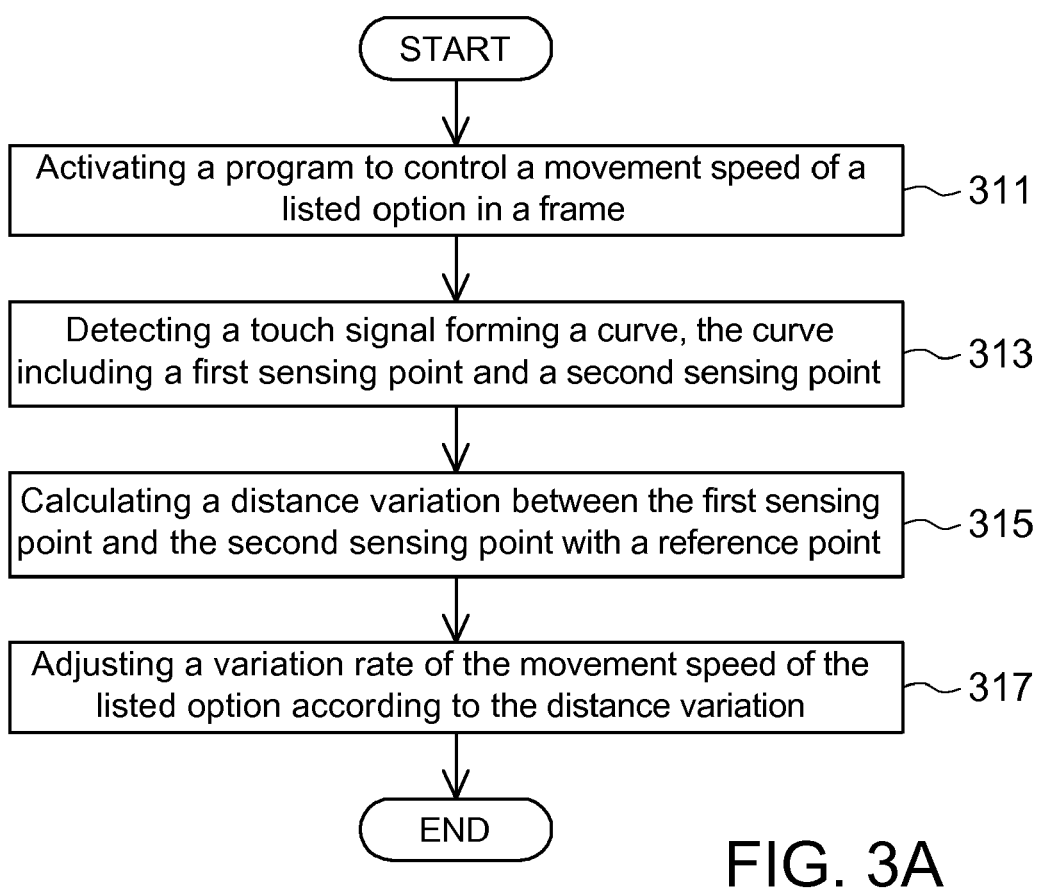
FIG. 3A is a flow chart showing the operating method of the touch control electronic device of FIG. 2 applied to a method of controlling a movement speed of a listed option in a frame.

FIG. 3A is a flow chart showing the operating method of the touch control electronic device of FIG. 2 applied to a method of controlling a movement speed of a listed option in a frame. Referring to FIG. 3A, the method includes the following steps. First, in step 311, a movement speed control program is activated to control the movement speed of a listed option in a frame. As shown in step 313, a touch signal is detected, wherein the touch signal forms a curve including a first sensing point and a second sensing point. Next, in step 315, a distance variation between the first sensing point and the second sensing point with a reference point is calculated. Then, in step 317, a variation rate of the movement speed of the listed option in the frame is adjusted according to the distance variation. Thus, the user may directly adjust the movement speed of the listed option in the frame by the touch operation of the finger. More particularly, when there are a lot of listed options and the user wants to select one of the last few options, he or she can increase the movement speed of the listed option using this method so that the movement speed is no longer restricted to the constant speed. Thus, the convenience in use and the operation efficiency can be enhanced.

Figure 3B:
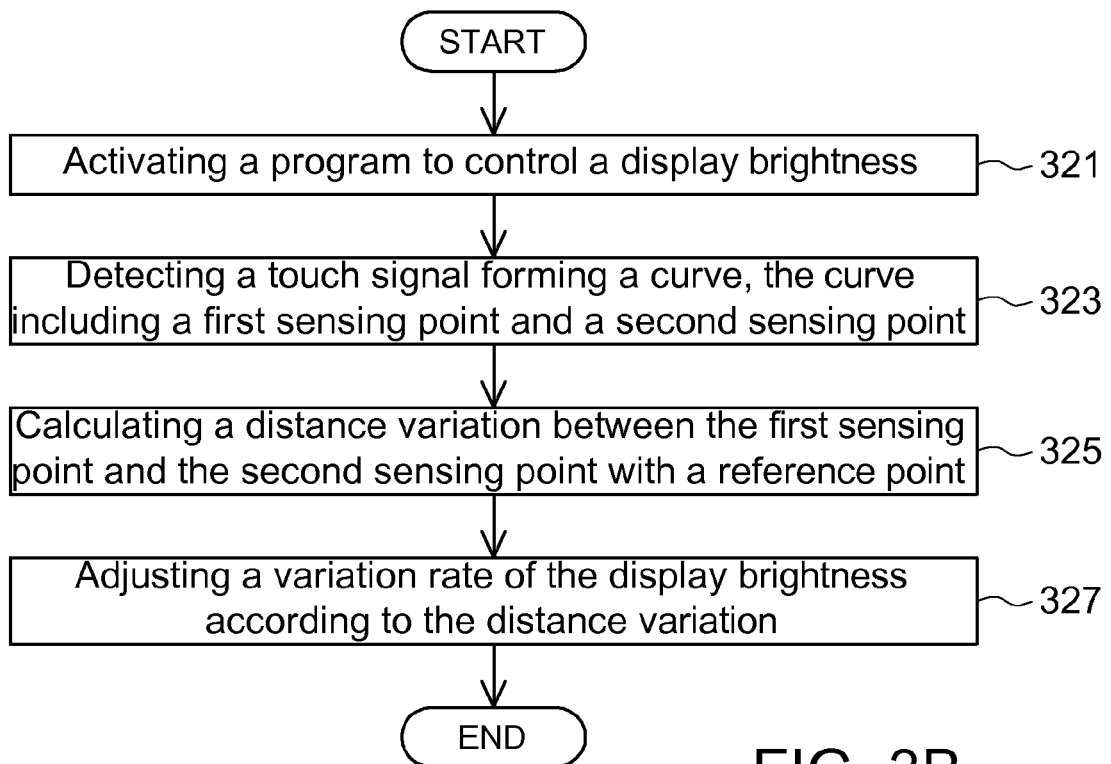
FIG. 3B is a flow chart showing the operating method of the touch control electronic device of FIG. 2 applied to the method of controlling the display brightness of a display screen.

FIG. 3B is a flow chart showing the operating method of the touch control electronic device of FIG. 2 applied to the method of controlling the display brightness of the display screen. Referring to FIG. 3B, the method includes the following steps. First, in step 321, a display brightness control program of the display screen is activated to control the display brightness. As shown in step 323, a touch signal is detected, wherein the touch signal forms a curve including a first sensing point and a second sensing point. Next, in step 325, a distance variation between the first sensing point and the second sensing point with a reference point is calculated. Thereafter, in step 327, the variation rate of the display brightness of the display screen is adjusted according to the distance variation. Thus, the user can effectively adjust the display brightness of the display screen by the touch operation of the finger. More particularly, when the display brightness needs to be finely tuned, the user only has to adopt the method to decrease the variation rate of the display brightness so that the variation rate is no longer restricted by the fixed adjustment rate and the precision of the fine tuning can be enhanced. Thus, the convenience in use and the operation efficiency can be enhanced.

Figure 3C:
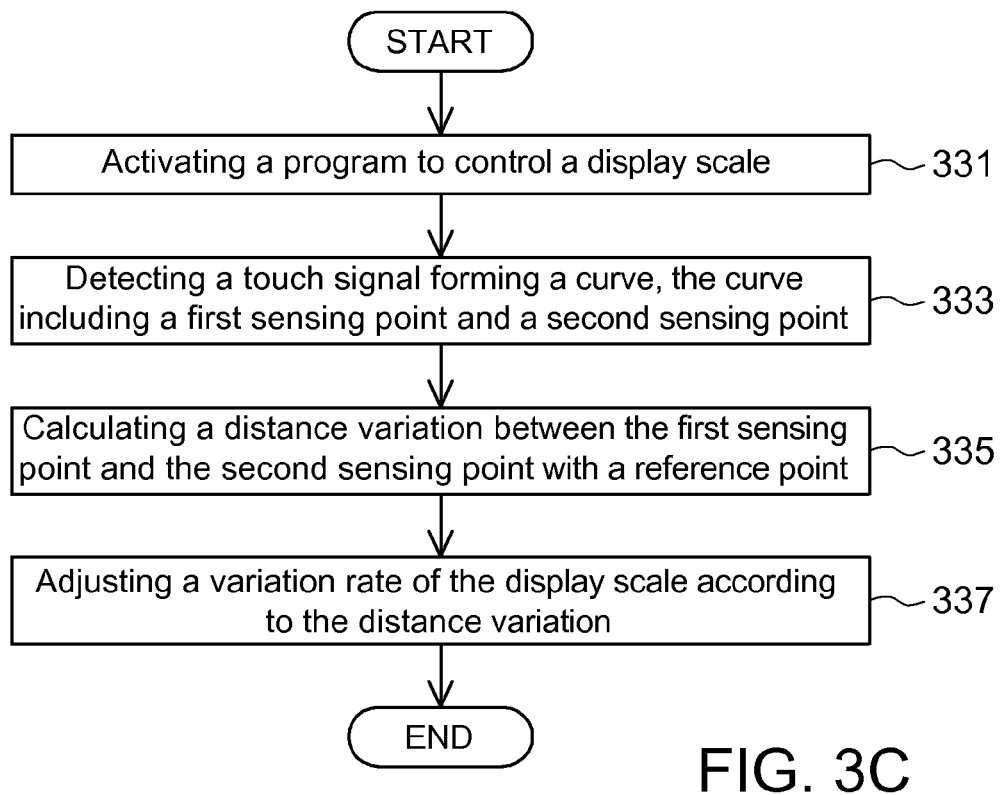
FIG. 3C is a flow chart showing the operating method of the touch control electronic device of FIG. 2 applied to the method of controlling a display scale of the display screen.

FIG. 3C is a flow chart showing the operating method of the touch control electronic device of FIG. 2 applied to the method of controlling a display scale of the display screen. Referring to FIG. 3C, the method includes the following steps. First, in step 331, a display scale control program of the display screen is activated to control the display scale. As shown in step 333, a touch signal is detected, wherein the touch signal forms a curve including a first sensing point and a second sensing point. Next, in step 335, a distance variation between the first sensing point and the second sensing point with a reference point is calculated. Thereafter, in step 337, the variation rate of the display scale of the display screen is adjusted according to the distance variation. Thus, the user may adjust the display scale of the display screen more effectively by the touch operation of the finger. More particularly, when the display scale needs to be finely tuned, the user only has to adopt the method to decrease the variation rate of the display scale so that the variation rate is no longer restricted by the fixed adjustment rate and the precision of the fine tuning can be enhanced. Thus, the convenience in use and the operation efficiency can be enhanced.

Figure 3D:
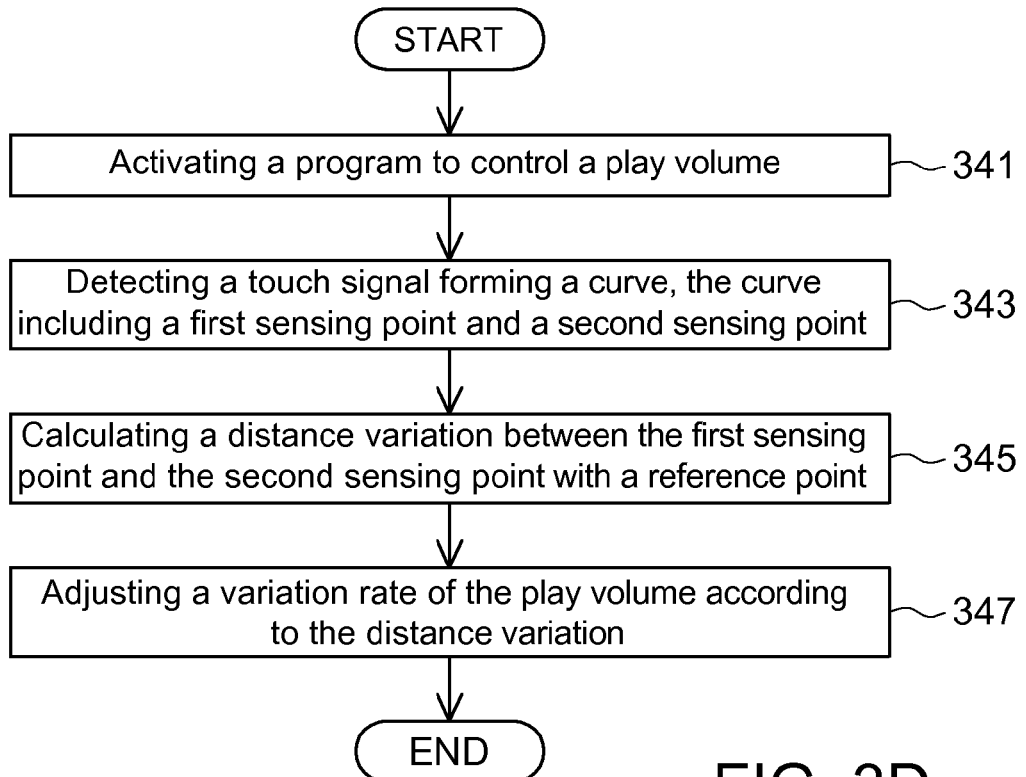
FIG. 3D is a flow chart showing the operating method of the touch control electronic device of FIG. 2 applied to the method of controlling a play volume of a volume player.

FIG. 3D is a flow chart showing the operating method of the touch control electronic device of FIG. 2 applied to the method of controlling a play volume of a volume player. Referring to FIG. 3D, the method includes the following steps. First, in step 341, a play volume control program of the volume player is activated to control the play volume. As shown in step 343, a touch signal is detected, wherein the touch signal forms a curve including a first sensing point and a second sensing point. Next, in step 345, a distance variation between the first sensing point and the second sensing point with a reference point is calculated. Then, in step 347, the variation rate of the play volume of the volume player is adjusted according to the distance variation. Thus, the user may adjust the play volume of the display screen more effectively by the touch operation of the finger. More particularly, when the play volume needs to be finely tuned, the user only has to adopt the method to decrease the variation rate of the play volume so that the variation rate is no longer restricted by the fixed adjustment rate and the precision of the fine tuning can be enhanced. Thus, the convenience in use and the operation efficiency can be enhanced.

Figure 3E:
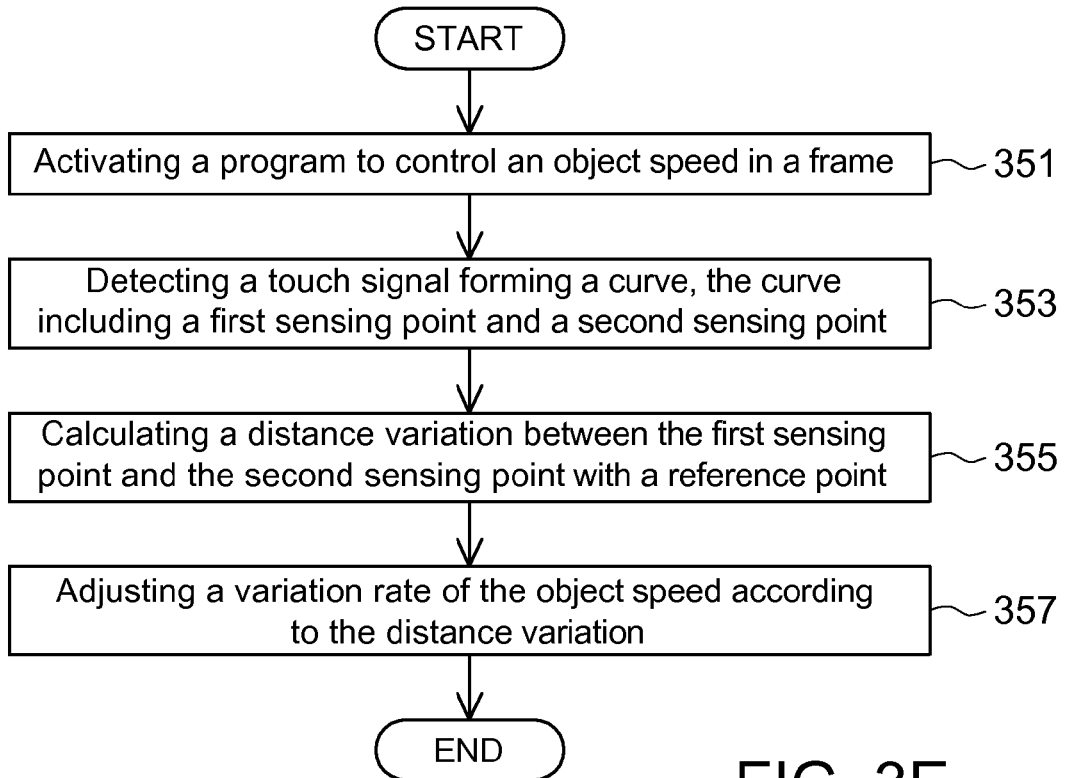
FIG. 3E is a flow chart showing the operating method of the touch control electronic device of FIG. 2 applied to the method controlling an object speed in the frame.

FIG. 3E is a flow chart showing the operating method of the touch control electronic device of FIG. 2 applied to the method of controlling an object speed in the frame. Referring to FIG. 3E, the method includes the following steps. First, in step 351, an object speed control program is activated to control an object in the frame. As shown in step 353, a touch signal is detected, wherein the touch signal forms a curve including a first sensing point and a second sensing point. Next, in step 355, a distance variation between the first sensing point and the second sensing point with a reference point is calculated. Thereafter, in step 357, the variation rate of the object speed in the frame is adjusted according to the distance variation. Thus, the user can directly adjust the object speed in the frame by the touch operation of the finger touch. Taking a car racing game as an example, when the car racing game proceeds, the object speed is the speed of the racing car. If the user wants to speed up the racing car within the shortest period of time, he or she only has to adopt this method to increase the object speed rapidly without being restricted by the fixed variation rate of the speed. Thus, the convenience in use and the operation efficiency can be enhanced.

Figure 4:
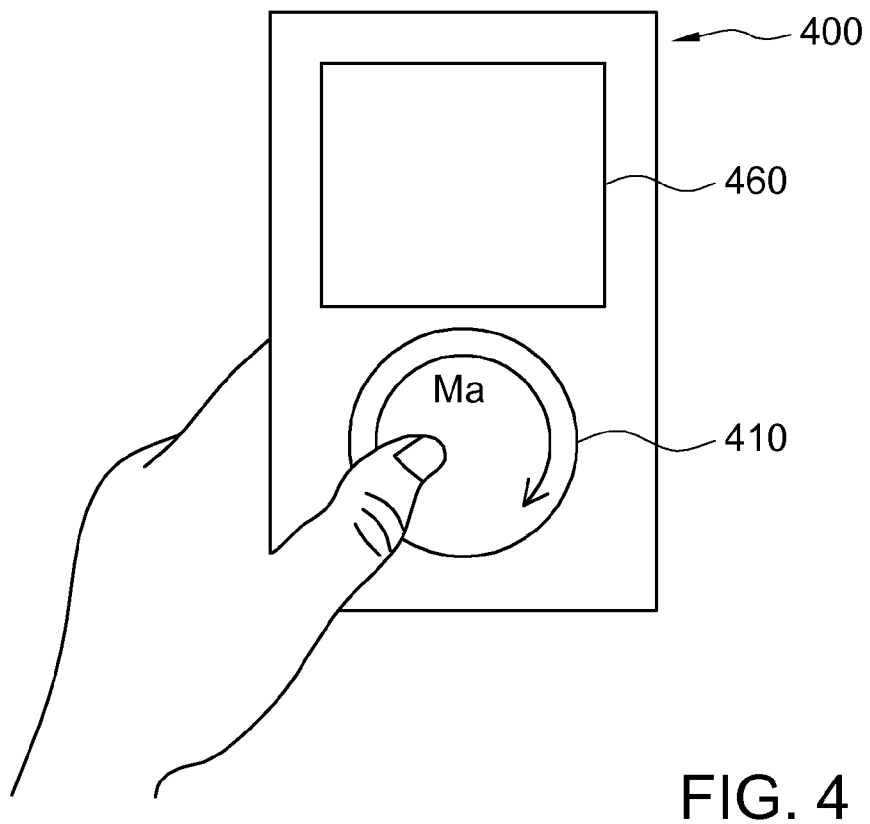
FIG. 4 is a schematic illustration showing a touch panel for detecting a touch signal in the touch control electronic device according to the embodiment of the invention.
Figure 5:
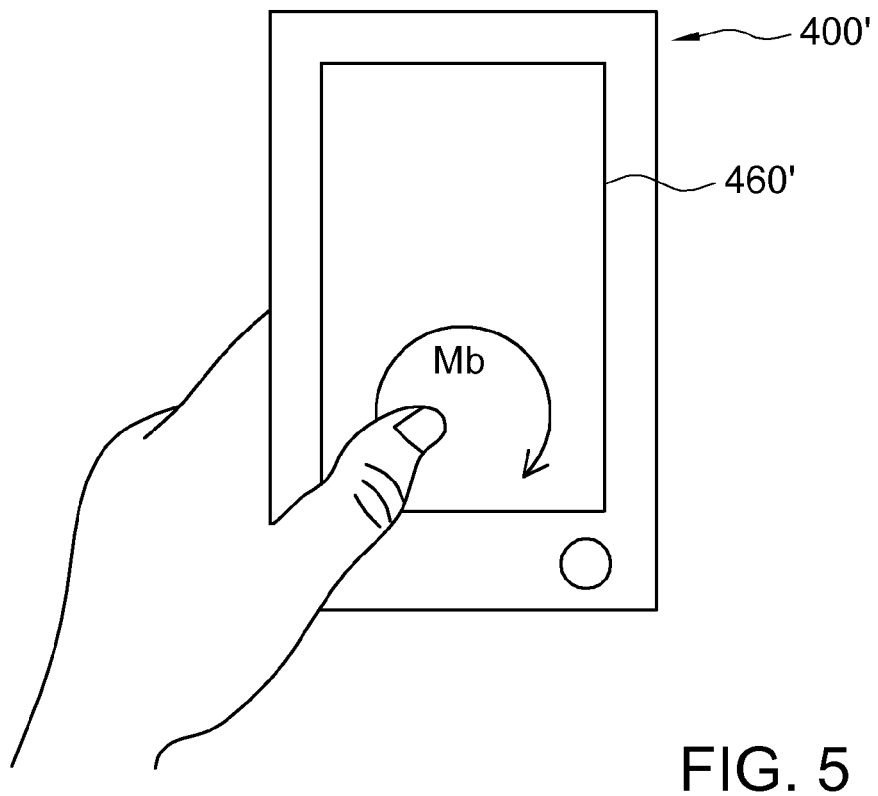
FIG. 5 is a schematic illustration showing a touch screen for detecting the touch signal in the touch control electronic device according to the embodiment.

FIG. 4 is a schematic illustration showing detection of a touch signal by a touch panel in the touch control electronic device according to the embodiment of the invention. FIG. 5 is a schematic illustration showing detection of the touch signal by a touch screen in the touch control electronic device according to the embodiment. In FIG. 4, a touch control electronic device 400 adopts a touch panel 410 as its sensing unit, and the touch panel 410 is, for example but not limited by, a touch wheel. A display panel 460 of the touch control electronic device 400 may be a typical display panel or a typical touch screen. The user may directly operate the touch panel 410 with his/her thumb while he or she holds the touch control electronic device 400 and so that the touch panel 410 senses a touch signal Ma. For example, the touch control electronic device may be a personal digital assistant (PDA), a smart phone, a portable video game, a portable multimedia player, a portable navigation device or any other handheld electronic device with a touch interface. Compared with FIG. 4, a touch control electronic device 400' of FIG. 5 directly adopts a touch screen 460' as its sensing unit. The user may directly operate the touch screen 460' with his/her thumb while he or she is holding the touch control electronic device 400' so that the touch screen 460' senses a touch signal Mb. As shown in FIGS. 4 and 5, the touch signal Ma and the touch signal Mb form the curves.

In the embodiment of this invention, the distance variation for changing the attribute value of the program is calculated according to the curve formed by the touch signal. FIGS. 6A to 6D show several calculating modes of a distance variation between sensing points with a reference point on the curve in the operating method of the touch control electronic device of FIG. 2. The distance variation may be calculated according to the measured value of the distance, the radius of curvature, the helical radius or the angular velocity.

Figure 6A:
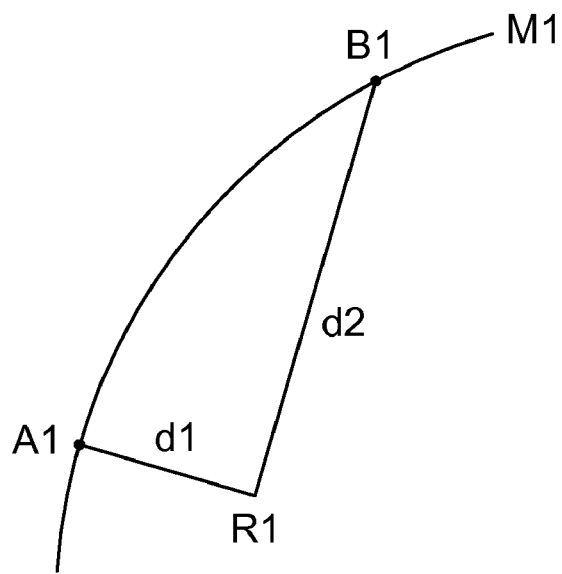
FIG. 6A shows a first calculating mode of a distance variation between sensing points with a reference point on a curve in the operating method of the touch control electronic device of FIG. 2.

The curve M1 of FIG. 6A includes a first sensing point A1 and a second sensing point B1. First, a reference point R1 is set according to the curve M1; and a first distance d1 between the first sensing point A1 and the reference point R1, and a second distance d2 between the second sensing point B1 and the reference point R1 are respectively calculated. Next, the difference between the second distance d2 and the first distance d1 is calculated to obtain the distance variation. That is, in the first calculating mode, the distance variation for changing the attribute value of the program is equal to the difference between the second distance d2 and the first distance d1.

Figure 6B:
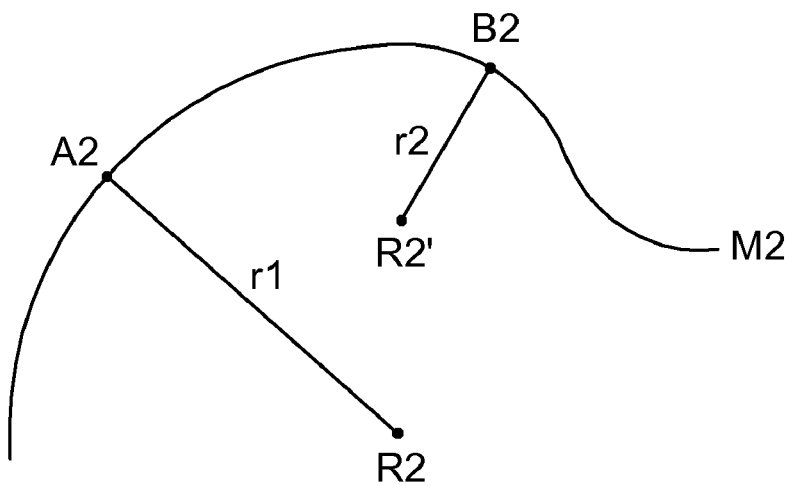
FIG. 6B shows a second calculating mode of the distance variation between the sensing points with the reference point on the curve in the operating method of the touch control electronic device of FIG. 2.

The curve M2 of FIG. 6B includes a first sensing point A2 and a second sensing point B2. First, a first radius of curvature r1 and a first center R2 of the curve M2 at the first sensing point A2 are obtained, and a second radius of curvature r2 and a second center R2' of the curve M2 at the second sensing point B2 are obtained. The first center R2 and the second center R2' are respectively set as the reference points for the first sensing point A2 and the second sensing point B2. Next, the difference between the second radius of curvature r2 and the first radius of curvature r1 is calculated to obtain the distance variation. That is, in the second calculating mode, the distance variation for changing the attribute value of the program is equal to the difference between the second radius of curvature r2 and the first radius of curvature r1.

Figure 6C:
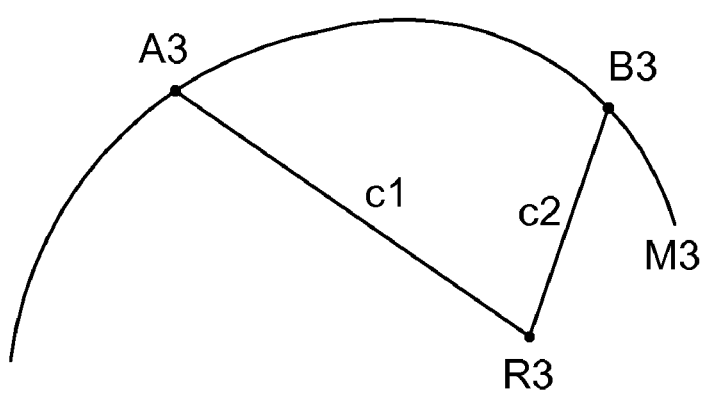
FIG. 6C shows a third calculating mode of the distance variation between the sensing points with the reference point on the curve in the operating method of the touch control electronic device of FIG. 2.

The curve M3 of FIG. 6C includes a first sensing point A3 and a second sensing point B3. First, it is judged that the curve M3 is substantially a helical curve, and the center point of the helical curve is set as the reference point R3. Next, a first helical radius c1 of the curve M3 at the first sensing point A3 and a second helical radius c2 of the curve M3 at the second sensing point B3 are respectively obtained. Then, the difference between the second helical radius c2 and the first helical radius c1 is calculated so that the distance variation is obtained. That is, the distance variation for changing the attribute value of the program in the third calculating mode is equal to a helical radius variation between the first sensing point and the second sensing point with the center point.

Figure 6D:
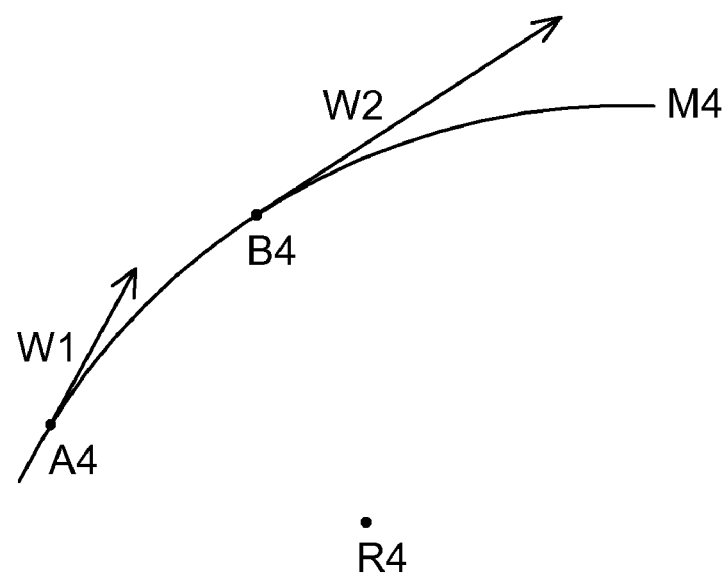
FIG. 6D shows a fourth calculating mode of the distance variation between the sensing points with the reference point on the curve in the operating method of the touch control electronic device of FIG. 2.

The curve M4 of FIG. 6D includes a first sensing point A4 and a second sensing point B4. First, a reference point R4 is set according to the curve M4; and a first instantaneous angular velocity w1 of the curve M4 at the first sensing point A4 relative to the reference point R4, and a second instantaneous angular velocity w2 of the curve M4 at the second sensing point B4 relative to the reference point R4 are obtained. Next, the difference between the second instantaneous angular velocity w2 and the first instantaneous angular velocity w1 is calculated so that the distance variation is indirectly calculated.

In the touch control electronic device and the operating method thereof according to the embodiment of the invention, the distance variation is calculated according to the curve formed by the touch signal so as to change the attribute value of the program. The invention may be applied to the control of the movement speed of the listed option in the frame, the control of the display brightness of the display screen, the control of the display scale of the display screen, the control of the play volume of the volume player, the control of the object speed in the frame or the control and adjustment of any other attribute of the program. The application of this operating method enables the user to adjust the variation rate of the movement speed of the listed option, the variation rate of the display brightness, the variation rate of the display scale, the variation rate of the play volume, the variation rate of the object speed or any other attribute value in an instinctive operating manner. Thus, the user needs not to learn too much logic architecture and too many operations and needs not to spend too much time to learn the operation interface so that the operation error rate can be reduced, the rapid and precise operation effect can be reached, and the convenience in use and the operation efficiency can be enhanced.

While the invention has been described by way of example and in terms of an embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touch control electronic device, comprising:
   a program having an attribute value;
   a sensing unit for detecting a touch signal, wherein the touch signal forms a curve, and the curve comprises a first sensing point and a second sensing point;
   a calculating unit for calculating a distance variation between the first sensing point and the second sensing point with a reference point, wherein the reference point is set according to the curve; and
   a processing unit for changing the attribute value of the program according to the distance variation;
   wherein the calculating unit further calculates a first distance between the first sensing point and the reference point, a second distance between the second sensing point and the reference point, and a difference between the second distance and the first distance, wherein the distance variation is equal to the difference between the second distance and the first distance.

2. The touch control electronic device according to claim 1, wherein the program controls a movement speed of a listed option in a frame, and the processing unit adjusts a variation rate of the movement speed of the listed option according to the distance variation, and the device further comprises:
   a display screen for displaying the frame, wherein the variation rate of the movement speed of the listed option in the frame is changed with the distance variation.

3. The touch control electronic device according to claim 1, wherein the program controls a display brightness, the processing unit adjusts a variation rate of the display brightness according to the distance variation, and the device further comprises:
   a display screen having the display brightness, wherein the variation rate of the display brightness is changed with the distance variation.

4. The touch control electronic device according to claim 1, wherein the program controls a display scale, the processing unit adjusts a variation rate of the display scale according to the distance variation, and the device further comprises:
   a display screen having the display scale, wherein the variation rate of the display scale is changed with the distance variation.

5. The touch control electronic device according to claim 1, wherein the program controls a play volume, the processing unit adjusts a variation rate of the play volume according to the distance variation, and the device further comprises:
   a volume player having the play volume, wherein the variation rate of the play volume is changed with the distance variation.

6. The touch control electronic device according to claim 1, wherein the program controls an object speed in a frame, the processing unit adjusts a variation rate of the object speed according to the distance variation, and the device further comprises:
   a display screen for displaying the frame, wherein the variation rate of the object speed is changed with the distance variation.

7. An operating method of a touch control electronic device, the method comprising the steps of:
   (a) activating a program;
   (b) detecting a touch signal forming a curve, the curve comprising a first sensing point and a second sensing point; and
   (c) calculating a distance variation between the first sensing point and the second sensing point with a reference point so as to change an attribute value of the program, wherein the reference point is set according to the curve;
   wherein the step (c) comprises:
   (c1) calculating a first distance between the first sensing point and the reference point;
   (c2) calculating a second distance between the second sensing point and the reference point; and
   (c3) calculating a difference between the second distance and the first distance to obtain the distance variation.

8. The method according to claim 7, wherein the program controls a movement speed of a listed option in a frame, and the step (c) comprises:
   adjusting a variation rate of the movement speed of the listed option according to the distance variation.

9. The method according to claim 7, wherein the program controls a display brightness, and the step (c) comprises:
   adjusting a variation rate of the display brightness according to the distance variation.

10. The method according to claim 7, wherein the program controls a display scale, and the step (c) comprises:
    adjusting a variation rate of the display scale according to the distance variation.

11. The method according to claim 7, wherein the program controls a play volume, and the step (c) comprises:
    adjusting a variation rate of the play volume according to the distance variation.

12. The method according to claim 7, wherein the program controls an object speed in a frame, and the step (c) comprises:
    adjusting a variation rate of the object speed according to the distance variation.

* * * * *